Aug. 14, 1934.  C. C. FARMER  1,969,787
JOURNAL BOX DUST GUARD
Filed Aug. 2, 1933
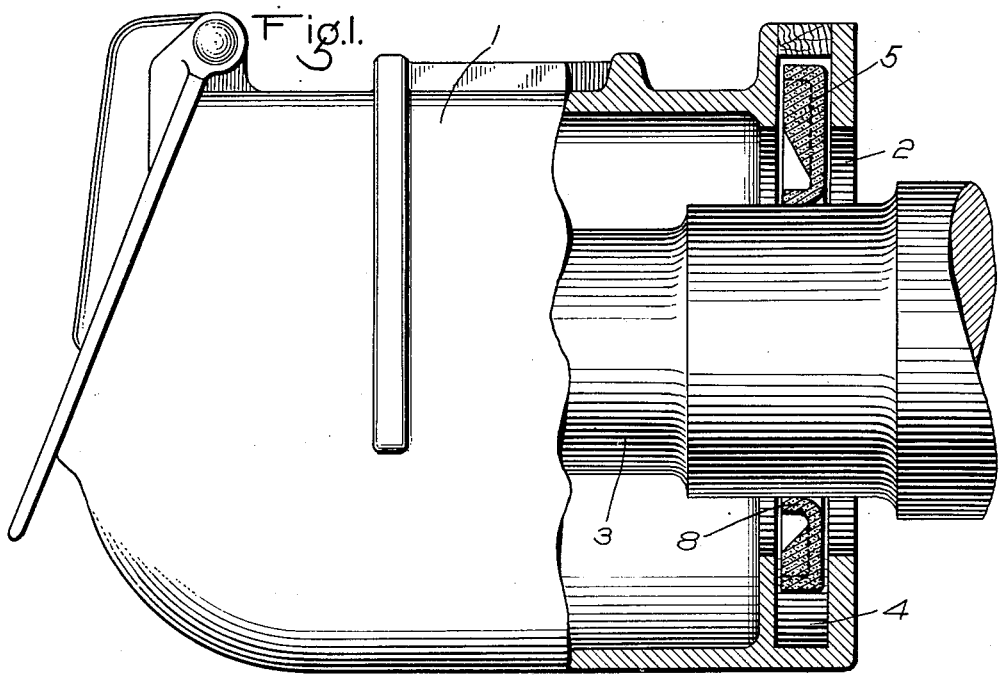
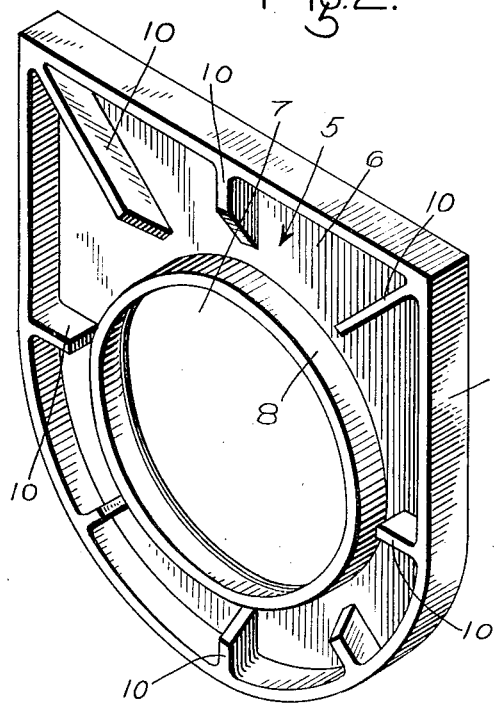
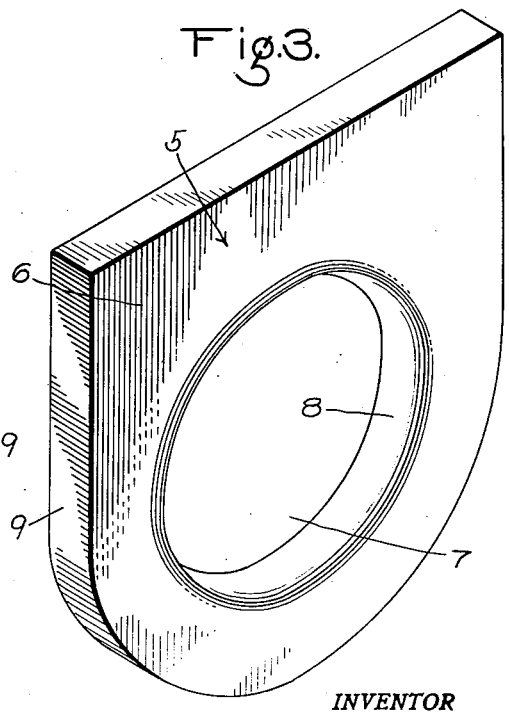
INVENTOR
CLYDE C. FARMER
BY *Wm. M. Cady*
ATTORNEY Patented Aug. 14, 1934

1,969,787

UNITED STATES PATENT OFFICE 1,969,787

JOURNAL BOX DUST GUARD

Clyde C. Farmer, Pittsburgh, Pa., assignor to The Westinghouse Air Brake Company, Wilmerding, Pa., a corporation of Pennsylvania Application August 2, 1933, Serial No. 683,336

2 Claims. (Cl. 286—6)

This invention relates to car journal boxes and has for its principal object to provide an improved dust guard for preventing the access of foreign material to the axle bearing and the interior of the box.

My improved dust guard is designed to be very cheaply manufactured and provides a dust guard which effectively prevents access of dirt to the axle bearing regardless of relative movement of the parts or of wear.

In the accompanying drawing, Fig. 1 is a side elevation of a car axle journal box, partly sectioned, to show the application of my improved dust guard; Fig. 2 an isometric view of the improved dust guard showing one face thereof; and Fig. 3 an isometric view of the dust guard, showing the opposite face thereof.

As shown in Fig. 1, the journal box 1 may be of the usual construction having at the inner end an opening 2, through which the car axle 3 extends into the box. The box is provided with the usual vertical slot 4 for receiving the dust guard.

My improved dust guard 5 is preferably made of a resilient rubber composition and is preferably formed in a mould and comprises a relatively thin base section 6 with a circular opening 7 through which the axle 3 extends. An annular flange 8 moulded in the dust guard defines said opening and is in the form of a truncated cone, such that when the axle is thrust through the opening 7, the flange is deflected to a cylindrical contour, as shown in Fig. 1, so that due to the resiliency of the material of which the dust guard is made, the flange constantly bears against the axle even after the flange has become worn.

In order to provide the desired stiffness and rigidity, and at the same time, a light weight guard, a flange 9 is moulded at the periphery of the guard and extending radially of the dust guard are ribs 10, which are united with the flange 9 and the base section 6 but which do not extend to the annular flange, so that the desired resiliency of the flange 8 is not interfered with.

To permit free vertical movement of the dust guard in the slot 4, there is provided a slight clearance between the side faces of the dust guard and the vertical walls of the slot 4, as shown in Fig. 1.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A dust guard for car journal boxes formed of resilient material and comprising a base section having an opening to receive the car axle, said opening being surrounded by an annular flange adapted to engage the axle, a flange following the contour of said dust guard, and radial ribs extending from said contour flange and terminating short of said annular flange.

2. A dust guard for car journal boxes moulded in one piece of resilient rubber composition and comprising a thin web section having an opening for receiving the car axle, a moulded annular flange on said web surrounding said opening and adapted to engage the car axle, a moulded flange on said web following the periphery of the dust guard, and moulded radially extending ribs united with said peripheral flange and said web and terminating short of said annular flange.

CLYDE C. FARMER.